(12) United States Patent
Hoxie et al.

(10) Patent No.: US 9,551,331 B2
(45) Date of Patent: Jan. 24, 2017

(54) PROPEL CIRCUIT AND WORK CIRCUIT COMBINATIONS FOR A WORK MACHINE

(71) Applicant: Eaton Corporation, Cleveland, OH (US)

(72) Inventors: Benjamin Maxfield Hoxie, Plymouth, MN (US); Timothy Isaac Meehan, Waconia, MN (US)

(73) Assignee: EATON CORPORATION, Cleveland, OH (US)

( * ) Notice: Subject to any disclaimer, the term of this patent is extended or adjusted under 35 U.S.C. 154(b) by 889 days.

(21) Appl. No.: 13/737,679

(22) Filed: Jan. 9, 2013

(65) Prior Publication Data

US 2013/0280111 A1    Oct. 24, 2013

Related U.S. Application Data

(60) Provisional application No. 61/584,650, filed on Jan. 9, 2012, provisional application No. 61/584,630, filed on Jan. 9, 2012.

(51) Int. Cl.
*F15B 21/14* (2006.01)
*F04B 17/05* (2006.01)
(Continued)

(52) U.S. Cl.
CPC ............ *F04B 17/05* (2013.01); *B60K 6/12* (2013.01); *B66F 9/07572* (2013.01);
(Continued)

(58) Field of Classification Search
CPC ........ E02F 9/2217; F15B 21/14; F15B 1/024; F15B 2211/20546; F16H 61/4096
See application file for complete search history.

(56) References Cited

U.S. PATENT DOCUMENTS 3,238,722 A * 3/1966 Berkman et al. ............... 60/414
4,778,020 A   10/1988 Hagin et al.
(Continued)

FOREIGN PATENT DOCUMENTS

DE    198 34 765 A1    2/2000
DE    101 28 582 A1    12/2002
(Continued)

OTHER PUBLICATIONS

Hydraulic Hybrid Research, http://www.epa.gov/otaq/technology/research/research-hhvs.htm, 3 pages (Date Printed Jan. 4, 2012).
(Continued)

*Primary Examiner* — Thomas E Lazo
*Assistant Examiner* — Abiy Teka
(74) *Attorney, Agent, or Firm* — Merchant & Gould, P.C.

(57) ABSTRACT

A hydraulic circuit architecture for a work vehicle includes a pump, a work circuit, a propel circuit, and a circuit selector. The work circuit is connected to an actuator for driving a work component of the work vehicle. The propel circuit includes a motor that is adapted to be connected to a drive train of the work vehicle. The propel circuit also includes an accumulator. The circuit selector selectively connects the pump to the work circuit and the propel circuit. The hydraulic circuit architecture is operable in a first mode and a second mode. In the first mode, the propel circuit is connected to the pump and the work circuit is disconnected from the pump. In the second mode, the work circuit is connected to the pump and the propel circuit is disconnected from the pump. When the hydraulic circuit architecture is in the second mode, stored energy from the accumulator can be used to drive the motor to cause propulsion of the work vehicle.

29 Claims, 11 Drawing Sheets

(51) Int. Cl.

| | | |
|---|---|---|
| F04B 49/00 | (2006.01) | |
| E02F 9/22 | (2006.01) | |
| B66F 9/075 | (2006.01) | |
| F15B 1/02 | (2006.01) | |
| B60K 6/12 | (2006.01) | |
| F16H 61/4078 | (2010.01) | |
| F16H 61/4096 | (2010.01) | |

(52) U.S. Cl.
CPC .......... *E02F 9/2217* (2013.01); *E02F 9/2253* (2013.01); *E02F 9/2282* (2013.01); *E02F 9/2289* (2013.01); *E02F 9/2292* (2013.01); *E02F 9/2296* (2013.01); *F04B 49/00* (2013.01); *F15B 1/02* (2013.01); *F15B 21/14* (2013.01); *F16H 61/4078* (2013.01); *F16H 61/4096* (2013.01); *F15B 2211/20523* (2013.01); *F15B 2211/20546* (2013.01); *F15B 2211/20561* (2013.01); *F15B 2211/20569* (2013.01); *F15B 2211/212* (2013.01); *F15B 2211/633* (2013.01); *F15B 2211/6309* (2013.01); *F15B 2211/6313* (2013.01); *F15B 2211/6333* (2013.01); *F15B 2211/6336* (2013.01); *F15B 2211/6343* (2013.01); *F15B 2211/6346* (2013.01); *F15B 2211/7135* (2013.01); *F15B 2211/88* (2013.01); *Y02T 10/6208* (2013.01)

(56) References Cited

U.S. PATENT DOCUMENTS

| | | |
|---|---|---|
| 5,495,912 A | 3/1996 | Gray, Jr. et al. |
| 5,505,527 A | 4/1996 | Gray, Jr. et al. |
| 5,887,674 A | 3/1999 | Gray, Jr. |
| 6,047,545 A * | 4/2000 | Deininger ............... 60/426 |
| 6,170,587 B1 | 1/2001 | Bullock |
| 6,305,162 B1 | 10/2001 | Cobo et al. |
| 6,619,325 B2 | 9/2003 | Gray, Jr. |
| 6,719,080 B1 | 4/2004 | Gray, Jr. |
| 6,840,334 B2 | 1/2005 | Marquardt |
| 6,876,098 B1 | 4/2005 | Gray, Jr. |
| 6,996,982 B2 | 2/2006 | Gray, Jr. |
| 6,998,727 B2 | 2/2006 | Gray, Jr. |
| 7,014,429 B2 | 3/2006 | Gray, Jr. et al. |
| 7,108,016 B2 | 9/2006 | Moskalik et al. |
| 7,121,304 B2 | 10/2006 | Gray, Jr. |
| 7,252,020 B2 | 8/2007 | Gray, Jr. et al. |
| 7,305,914 B2 | 12/2007 | Gray, Jr. |
| 7,305,915 B2 | 12/2007 | Gray, Jr. |
| 7,337,869 B2 | 3/2008 | Gray, Jr. et al. |
| 7,374,005 B2 | 5/2008 | Gray, Jr. |
| 7,456,509 B2 | 11/2008 | Gray, Jr. |
| 7,500,424 B2 | 3/2009 | Gray, Jr. et al. |
| 7,527,074 B1 | 5/2009 | Gray, Jr. |
| 7,537,075 B2 | 5/2009 | Gray, Jr. et al. |
| 7,553,085 B2 | 6/2009 | Gray, Jr. |
| 7,594,802 B2 | 9/2009 | Gray, Jr. |
| 7,617,761 B2 | 11/2009 | Gray, Jr. |
| 7,677,871 B2 | 3/2010 | Gray et al. |
| 7,770,697 B2 | 8/2010 | Futahashi et al. |
| 7,857,082 B2 | 12/2010 | Gray, Jr. |
| 7,984,783 B2 | 7/2011 | Gray, Jr. et al. |
| 7,987,940 B2 | 8/2011 | Bryson et al. |
| 8,020,587 B2 | 9/2011 | Gray, Jr. |
| 8,052,116 B2 | 11/2011 | Gray, Jr. |
| 8,087,733 B2 | 1/2012 | Fouquet et al. |
| 8,100,221 B2 | 1/2012 | Stuhldreher et al. |
| 8,177,009 B2 | 5/2012 | Gray, Jr. |
| 8,297,198 B2 | 10/2012 | Read |
| 8,306,682 B2 | 11/2012 | Gray, Jr. |
| 8,356,547 B2 | 1/2013 | Gray, Jr. |
| 8,356,985 B2 | 1/2013 | Gray. Jr. et al. |
| 8,375,982 B2 | 2/2013 | Gray, Jr. |
| 8,381,851 B2 | 2/2013 | Gray, Jr. |
| 2001/0030085 A1 | 10/2001 | Nagata et al. |
| 2005/0042121 A1 * | 2/2005 | Suzuki et al. ............... 417/440 |
| 2005/0246082 A1 | 11/2005 | Miki et al. |
| 2006/0051216 A1 * | 3/2006 | Gray et al. ............... 417/244 |
| 2007/0095547 A1 | 5/2007 | Moore |
| 2008/0135325 A1 | 6/2008 | Stuhldreher et al. |
| 2009/0145120 A1 | 6/2009 | Esders et al. |
| 2009/0210120 A1 * | 8/2009 | Stein et al. ............... 701/51 |
| 2010/0186408 A1 * | 7/2010 | Rose et al. ............... 60/629 |
| 2011/0030364 A1 | 2/2011 | Persson et al. |
| 2011/0071716 A1 | 3/2011 | Gray, Jr. |
| 2011/0073191 A1 | 3/2011 | Gray, Jr. |
| 2011/0153129 A1 | 6/2011 | Gray, Jr. |
| 2012/0324879 A1 | 12/2012 | Haugen |
| 2013/0149093 A1 | 6/2013 | Kaneko et al. |
| 2013/0195681 A1 | 8/2013 | Meehan |

FOREIGN PATENT DOCUMENTS

| | | |
|---|---|---|
| DE | 101 51 831 A1 | 5/2003 |
| DE | 10 2008 021 8 | 11/2009 |
| DE | 10 2010 010 4 | 9/2011 |
| EP | 0 140 046 B1 | 4/1987 |
| EP | 2 071 196 A1 | 6/2009 |
| JP | 2001-97693 | 4/2001 |
| WO | WO 2009/006201 A2 | 1/2009 |
| WO | WO 2015/171692 A1 | 11/2015 |

OTHER PUBLICATIONS

International Search Report and Written Opinion for PCT/US2013/020833 mailed Jul. 29, 2013.
U.S. Appl. No. 61/326,317 entitled "Methods for Safe Operation of Hydraulic Hybrid Vehicles with Over-Center Pump/Motors".
Invitation to Pay Additional Fees with Partial International Search for PCT/US2013/020833 mailed Apr. 24, 2013.
PCT Patent Application No. PCT/US2015/057398 filed Oct. 26, 2015.

* cited by examiner

PROPEL CIRCUIT AND WORK CIRCUIT COMBINATIONS FOR A WORK MACHINE

CROSS-REFERENCE TO RELATED APPLICATIONS

The present application claims priority to U.S. Provisional Patent Application Ser. No. 61/584,650, entitled "PROPEL CIRCUIT AND WORK CIRCUIT COMBINATIONS FOR A WORK MACHINE", and filed on Jan. 9, 2012, and the present application claims priority to U.S. Provisional Patent Application Ser. No. 61/584,630, entitled "METHOD FOR OBTAINING A FULL RANGE OF LIFT SPEEDS USING A SINGLE INPUT", and also filed on Jan. 9, 2012. The above identified disclosures are hereby incorporated by reference in their entireties. The present patent application also relates to U.S. patent application Ser. No. 13/737,381, entitled "METHOD FOR OBTAINING A FULL RANGE OF LIFT SPEEDS USING A SINGLE INPUT", filed on Jan. 9, 2013, now U.S. Pat. No. 9,453,503, which application is hereby incorporated by reference in its entirety.

BACKGROUND

Work machines can be used to move material, such as pallets, dirt, and/or debris. Examples of work machines include fork lifts, wheel loaders, track loaders, excavators, backhoes, bull dozers, telehandlers, etc. The work machines typically include a work implement (e.g., a fork) connected to the work machine. The work implements attached to the work machines are typically powered by a hydraulic system. The hydraulic system can include a hydraulic pump that is powered by a prime mover, such as a diesel engine. The hydraulic pump can be connected to hydraulic actuators by a set of valves to control flow of pressurized hydraulic fluid to the hydraulic actuators. The pressurized hydraulic fluid causes the hydraulic actuators to extend, retract, or rotate and thereby cause the work implement to move.

The work machine may further include a propulsion system adapted to propel the work machine. The propulsion system may include a hydraulic pump that is powered by the prime mover. The propulsion system may include a hydrostatic drive.

SUMMARY

One aspect of the present disclosure relates to a hydraulic circuit architecture for a mobile work vehicle. The hydraulic circuit architecture includes a drive hydraulic pump, a hydraulic work circuit, a hydraulic propel circuit, and a circuit selector. The hydraulic circuit architecture may be adapted to include a single pump as the drive hydraulic pump and thereby provide benefits of avoiding the costs of buying and maintaining multiple pumps as well as benefits of space and weight savings for the hydraulic work machine. The drive hydraulic pump is adapted to be driven by a prime mover, and has a high pressure side and a low pressure side. The hydraulic work circuit is adapted for connection to at least one actuator for driving a work component of the mobile work vehicle. The hydraulic propel circuit includes a propel hydraulic motor that is adapted to be connected to a drive train of the mobile work vehicle. The hydraulic propel circuit also includes a hydraulic accumulator. The circuit selector selectively connects the high pressure side of the drive hydraulic pump to the hydraulic work circuit and the hydraulic propel circuit. The hydraulic circuit architecture is operable in a first mode and a second mode. In the first mode, the hydraulic propel circuit is connected to the high pressure side of the drive hydraulic pump and the hydraulic work circuit is disconnected from the high pressure side of the drive hydraulic pump. In the second mode, the hydraulic work circuit is connected to the high pressure side of the drive hydraulic pump and the hydraulic propel circuit is disconnected from the high pressure side of the drive hydraulic pump. When the hydraulic circuit architecture is in the second mode, stored energy from the hydraulic accumulator can be used to drive the propel hydraulic motor to cause propulsion of the mobile work vehicle.

The hydraulic circuit architecture may be operable in at least one mode where the hydraulic work circuit is hydraulically isolated from the hydraulic propel circuit, and means for transferring energy from the hydraulic accumulator to the hydraulic work circuit is provided.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
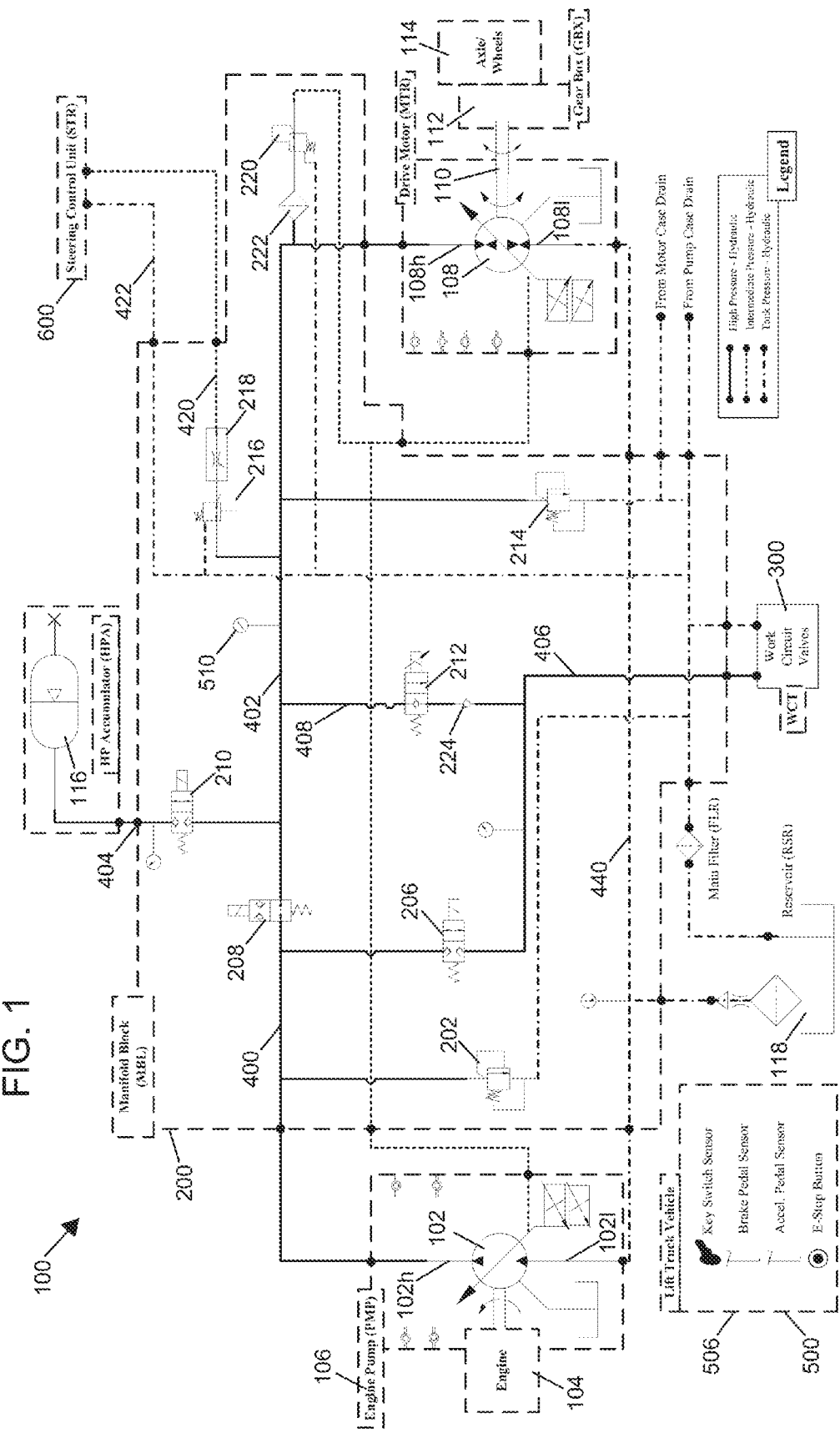
FIG. 1 is a schematic diagram of a hydraulic system having features that are examples according to the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure relates generally to hydraulic circuit architectures for use in work vehicles. A hydraulic circuit architecture, in accordance with the principles of the present disclosure, can include a propel circuit and a work circuit. In certain embodiments, the propel circuit and the work circuit can be powered by a same hydraulic pump structure (e.g., a hydraulic pump or a hydraulic pump/motor). In certain embodiments, the hydraulic pump structure includes a single drive pump (e.g., only one pump, only one pumping rotating group, only one pump/motor, etc.). In certain embodiments, the propel circuit can include a hydraulic accumulator and a hydraulic propulsion pump/motor for powering propulsion elements (e.g., wheels, tracks, etc.) of the work vehicle through a drivetrain. The work circuit can include various actuators for powering work components such as lifts, clamps, booms, buckets, blades, and/or other structures. The various actuators may include hydraulic cylinders, hydraulic motors, etc. In a preferred embodiment, the hydraulic architecture is used on a forklift 50 (see FIG. 9) where the propulsion circuit powers a drivetrain 114 coupled to drive wheels 54 of the forklift 50, and the work circuit includes valving and actuators (e.g., hydraulic cylinders) for raising and lowering a fork 52 of the forklift 50, for front-to-back tilting of the fork 52, and for left and right shifting of the fork 52.

In certain embodiments, the hydraulic accumulator of the propulsion circuit can be used to provide numerous functions and benefits. For example, the provision of the hydraulic accumulator allows the hydraulic pump/motor and prime mover powering the propulsion circuit to be consistently operated at peak efficiency or near peak efficiency. Moreover, accumulated energy in the hydraulic accumulator can be used to provide power for starting a power source (e.g., a prime mover, a diesel engine, or other engine) used to drive the hydraulic pump/motor. Additionally, the hydraulic accumulator can be used to provide propulsion functionality even when the power source coupled to the hydraulic pump/motor is not operating. Similarly, the hydraulic accumulator can be used to provide work circuit functionality even when the power source coupled to the hydraulic pump/motor is not operating. Furthermore, by operating the propulsion hydraulic pump/motor as a motor during braking/deceleration events, energy corresponding to the deceleration of the work vehicle can be back-fed and stored by the hydraulic accumulator for later re-use to enhance overall efficiency of the work vehicle.

In certain embodiments, one (i.e., a single) hydraulic pump/motor (e.g., a hydraulic pump/motor 102, shown at FIG. 1) is used to power both the propulsion circuit and the working circuit. In such an embodiment, a circuit selector (i.e., a mode selector) can be provided for selectively placing a high pressure side of the hydraulic pump/motor in fluid communication with either the propulsion circuit or the working circuit. The circuit selector can include one or more valves. Furthermore, a cross-over valve can be provided for selectively providing fluid communication between the propulsion circuit and the work circuit. By opening the cross-over valve, power from the hydraulic accumulator can be used to drive one or more actuators of the work circuit thereby allowing for actuation of the actuators of the work circuit, even when the power source is turned off. When the circuit selector has placed the pump/motor in fluid communication with the propulsion circuit for propelling the work vehicle, the various components of the work circuit can be actuated by opening the cross-over valve. Additionally, when the circuit selector has placed the pump/motor in fluid communication with the work circuit, the hydraulic accumulator can be used to provide for propulsion and steering of the work vehicle. It will be appreciated that a steering component is preferably incorporated into the hydraulic propulsion circuit. When the power source is turned off, the hydraulic accumulator can be used to power the steering component, power the propulsion elements, and/or power the various components of the work circuit. It will be appreciated that such activities can be conducted individually or simultaneously. The cross-over valve can provide a variable size orifice.

In certain embodiments, the hydraulic pump/motor coupled to the power source is an open circuit pump/motor having a rotating group and a swash plate that is adjustable to control an amount of hydraulic fluid displaced by the pump/motor per rotation of a pump/motor shaft by the power source. In certain embodiments, the swash plate has an over-center configuration. When the pump/motor is operating as a pump, the swash plate is on a first side of center and the power source rotates the pump/motor shaft in a first direction such that hydraulic fluid is pumped through the pump/motor from a low pressure side in fluid communication with a reservoir/tank to a high pressure side in fluid communication with the circuit selector. When the hydraulic pump/motor is operated as a motor, the swash plate may be moved to a second side of center and hydraulic fluid from the hydraulic accumulator is directed through the pump/motor from the high pressure side to the low pressure side thereby causing the pump/motor shaft to rotate in the same rotational direction that the pump/motor shaft rotates when driven by the power source. In this way, hydraulic energy from the hydraulic accumulator can be used to start modes including use of the power source.

Figure 8:
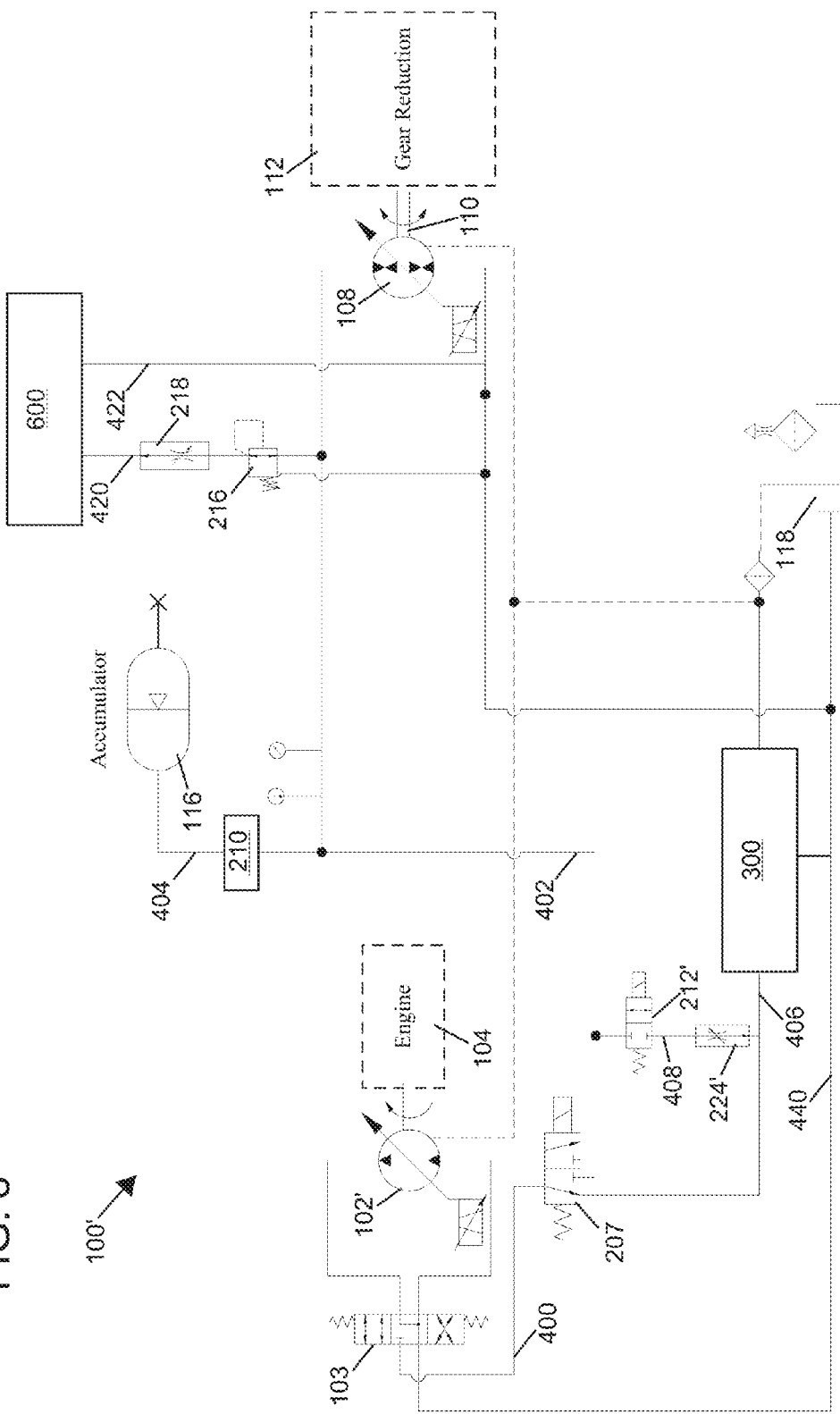
FIG. 8 is a schematic diagram of another hydraulic system having features that are examples according to the principles of the present disclosure.

The propulsion pump/motor can also be an open circuit pump/motor having a low pressure side connected to the reservoir/tank and a high pressure side that connects to the hydraulic pump/motor coupled to the power source through the circuit selector. The propulsion pump/motor can include a rotating group and a swash plate that can be adjusted to control displacement of the propulsion pump/motor for each revolution of a shaft of the propulsion pump/motor. The swash plate can be an over-center swash plate that allows for bi-directional rotation of the shaft of the propulsion pump/motor. For example, when the swash plate is on a first side of center, hydraulic fluid flow through the pump/motor from the high pressure side to the low pressure side can drive the shaft in a clockwise direction. In contrast, when the swash plate is on a second side of center, hydraulic fluid flow through the propulsion pump/motor in a direction from the high pressure side to the low pressure side causes rotation of the shaft in a counterclockwise direction. In this way, the propulsion pump/motor can be used to drive the work vehicle in both forward and rearward directions. Moreover, during a braking event, the propulsion pump/motor can function as a pump and can direct hydraulic fluid from the reservoir to the hydraulic accumulator to charge the hydraulic accumulator thereby capturing energy associated with the deceleration. Thus, the propulsion pump/motor and the hydraulic accumulator provide a braking/deceleration and energy storage function. It will be appreciated that in other embodiments (e.g., an embodiment illustrated at FIG. 8), valving can be used in combination with non-over-center pump/motors to provide the same or similar functionality as the over-center pump/motors described above. The non-over-center pump/motors and the valving can be used as the hydraulic pump/motor coupled to the power source, as shown at FIG. 8, and/or can be used as the propulsion hydraulic pump/motor that is coupled to the drivetrain.

Figure 9:
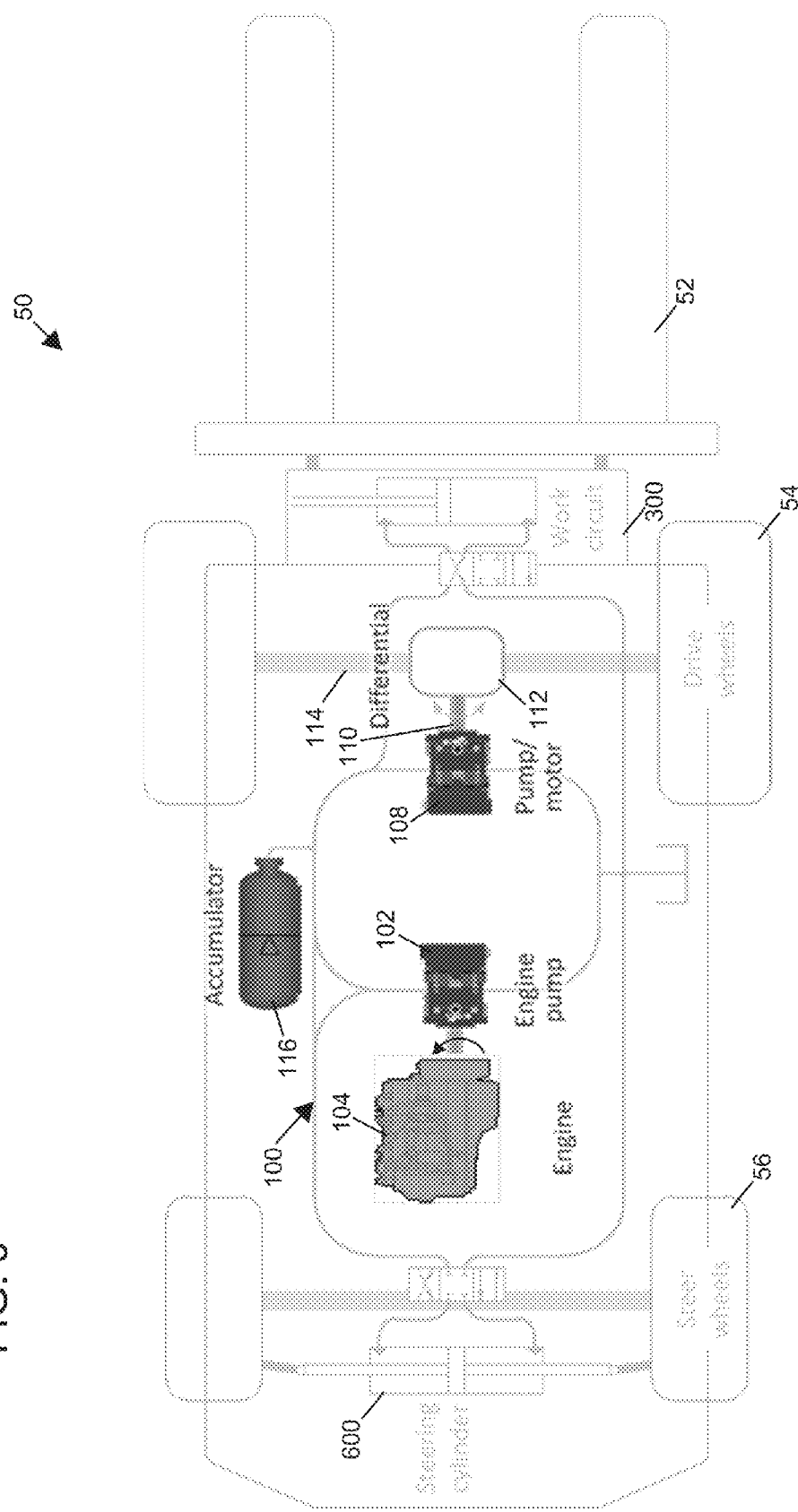
FIG. 9 is a schematic top plan view of a work vehicle including the hydraulic system of FIG. 1 or 8 according to the principles of the present disclosure.

According to the principles of the present disclosure and as illustrated at FIGS. 1-7, a hydraulic system 100 (i.e., a hydraulic circuit architecture) is adapted to power the drivetrain 114 of the work machine 50 (i.e., a work vehicle, a mobile work vehicle, a forklift, a lift truck, a fork truck, a wheel loader, a digger, an excavator, a backhoe loader, etc.). The hydraulic system 100 may be further adapted to power a work circuit 300 of the work machine 50. The hydraulic system 100 may be adapted to power a steering control unit 600 (e.g., a hydraulic steering circuit) of the work machine 50. As depicted at FIG. 9, the work machine 50 includes a work attachment 52 (e.g., the fork, a work component, etc.), at least one drive wheel 54, and at least one steer wheel 56. In certain embodiments, one or more drive wheel 54 may be combined with one or more steer wheel 56. In certain embodiments, the work machine 50 may include only a single drive hydraulic pump.

The hydraulic system 100 is adapted to recover energy and store the energy in a hydraulic accumulator 116 for reuse. For example, when the work machine 50 is decelerated, the drivetrain 114 may deliver kinetic energy to the hydraulic system 100 and thereby store the energy in the hydraulic accumulator 116. The hydraulic system 100 is also adapted to quickly start a prime mover 104 (e.g., the internal combustion engine) of the work machine 50 with the energy stored in the hydraulic accumulator 116. The hydraulic system 100 may be adapted to power the drivetrain 114, the work circuit 300, and/or the steering control unit 600 without the prime mover 104 running by drawing hydraulic power from the hydraulic accumulator 116. In certain embodiments, the prime mover 104 may drive only a single hydraulic pump. In certain embodiments, the prime mover 104 may drive only a single hydraulic pump that powers the drivetrain 114 and the work circuit 300. In certain embodiments, the prime mover 104 may drive only a single hydraulic pump that powers at least the drivetrain 114 and the work circuit 300. In certain embodiments, the prime mover 104 may drive only a single hydraulic pump that powers the drivetrain 114, the work circuit 300, and the steering control unit 600. In certain embodiments, the prime mover 104 may drive only a single hydraulic pump that at least powers the drivetrain 114, the work circuit 300, and the steering control unit 600.

Figure 2:
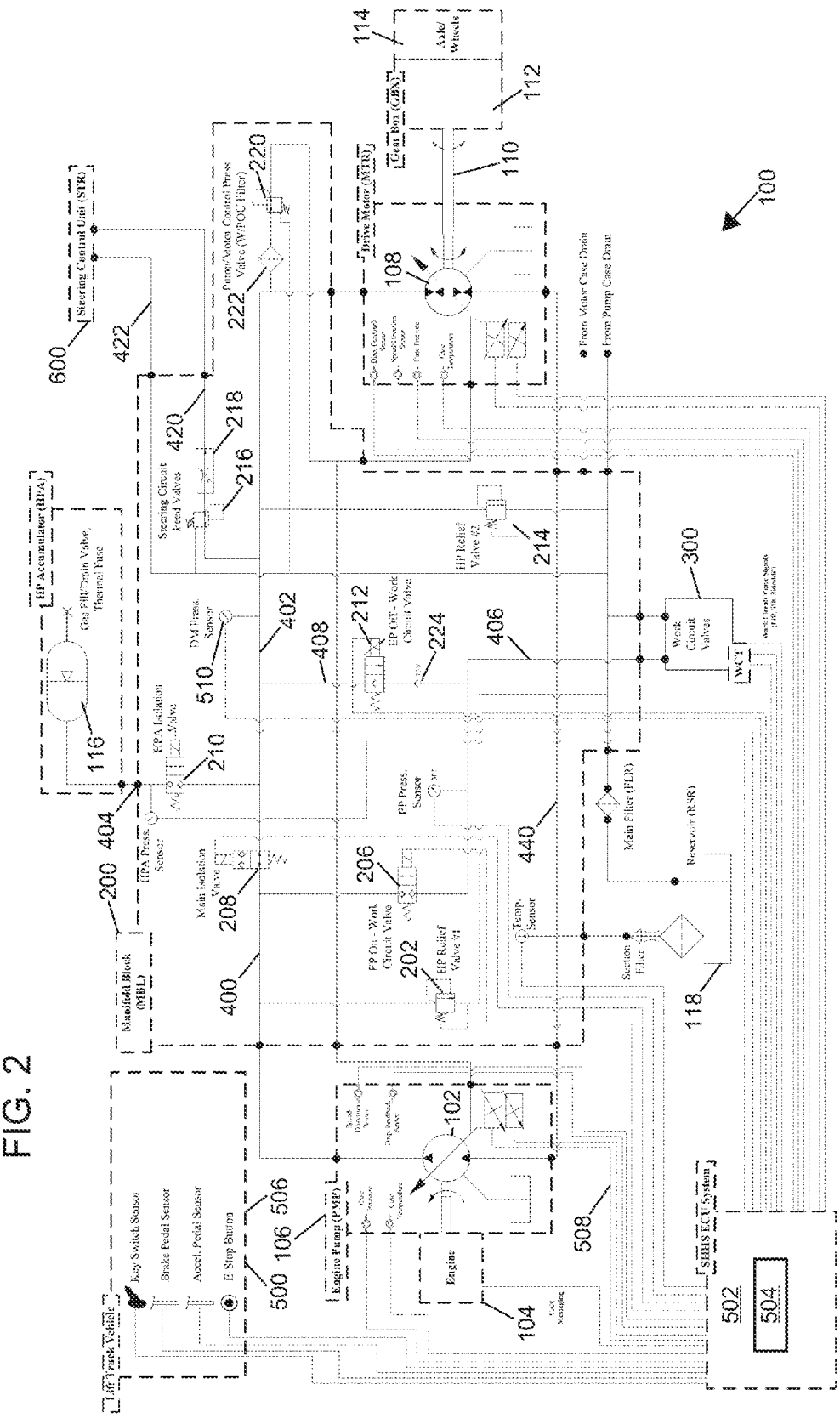
FIG. 2 is a schematic diagram of the hydraulic system of FIG. 1 further illustrating a control system of the hydraulic system.
Figure 3:
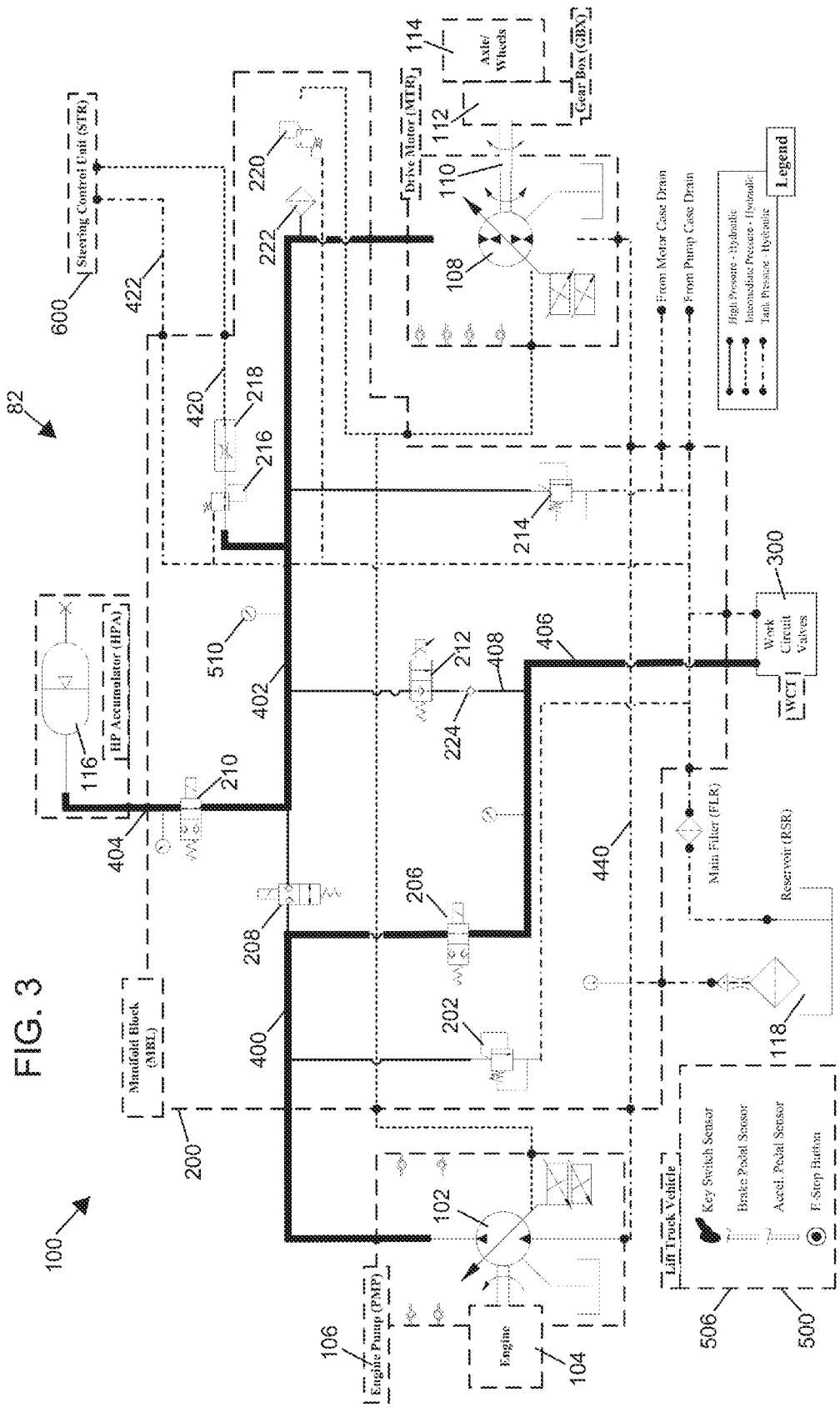
FIG. 3 is the schematic diagram of FIG. 1 further illustrating a first mode of the hydraulic system.
Figure 4:
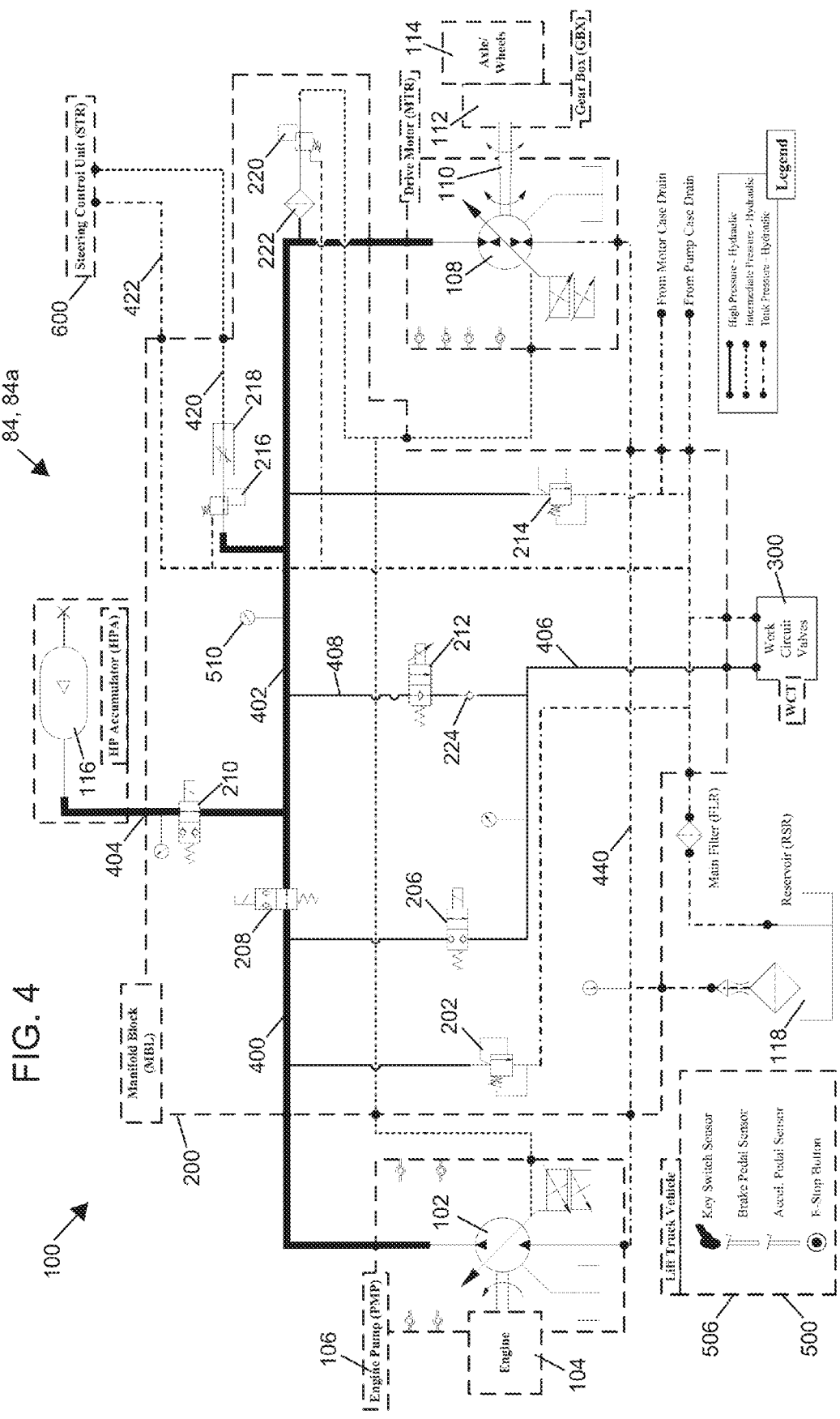
FIG. 4 is the schematic diagram of FIG. 1 further illustrating a second mode of the hydraulic system.
Figure 5:
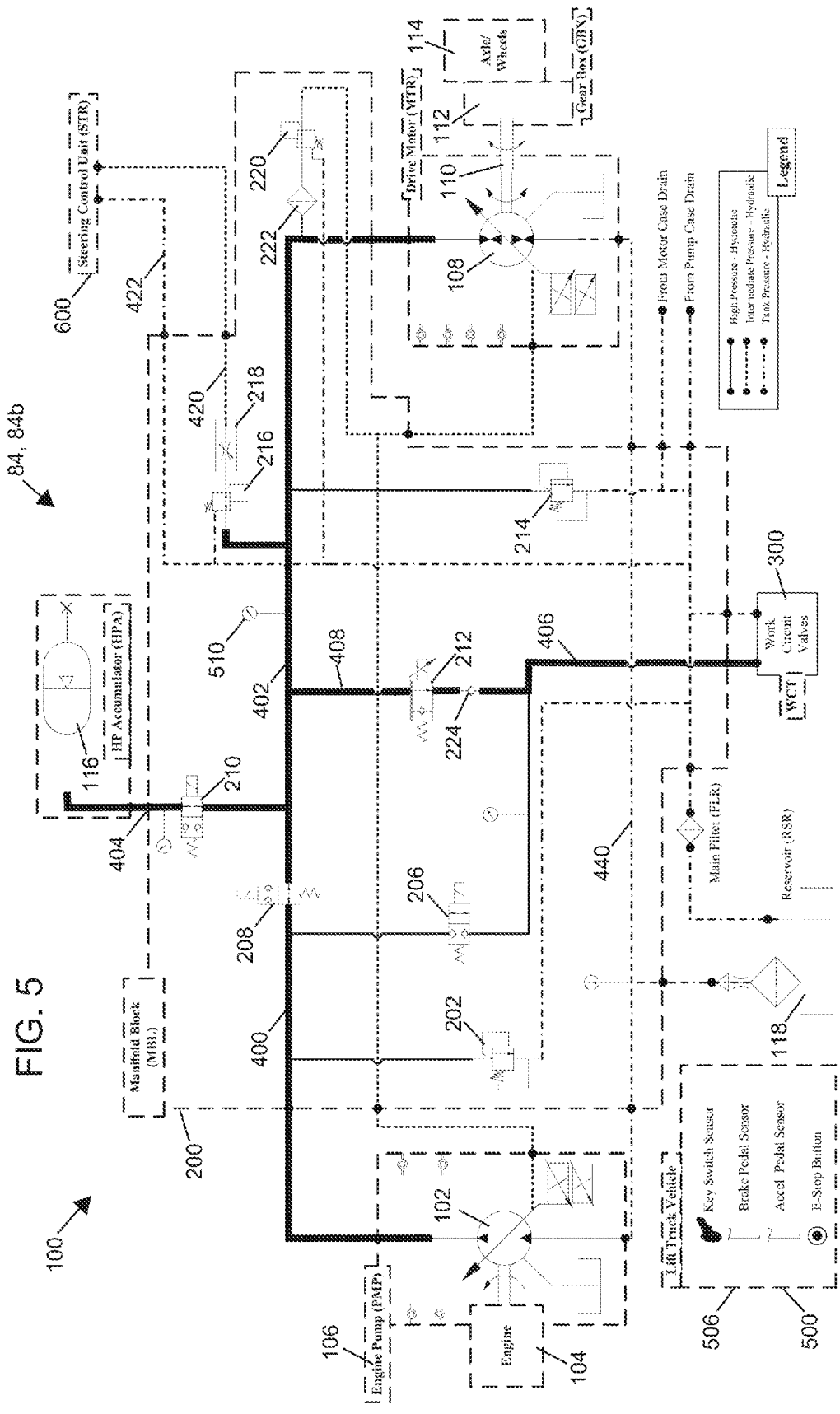
FIG. 5 is the schematic diagram of FIG. 1 further illustrating a third mode of the hydraulic system.
Figure 6:
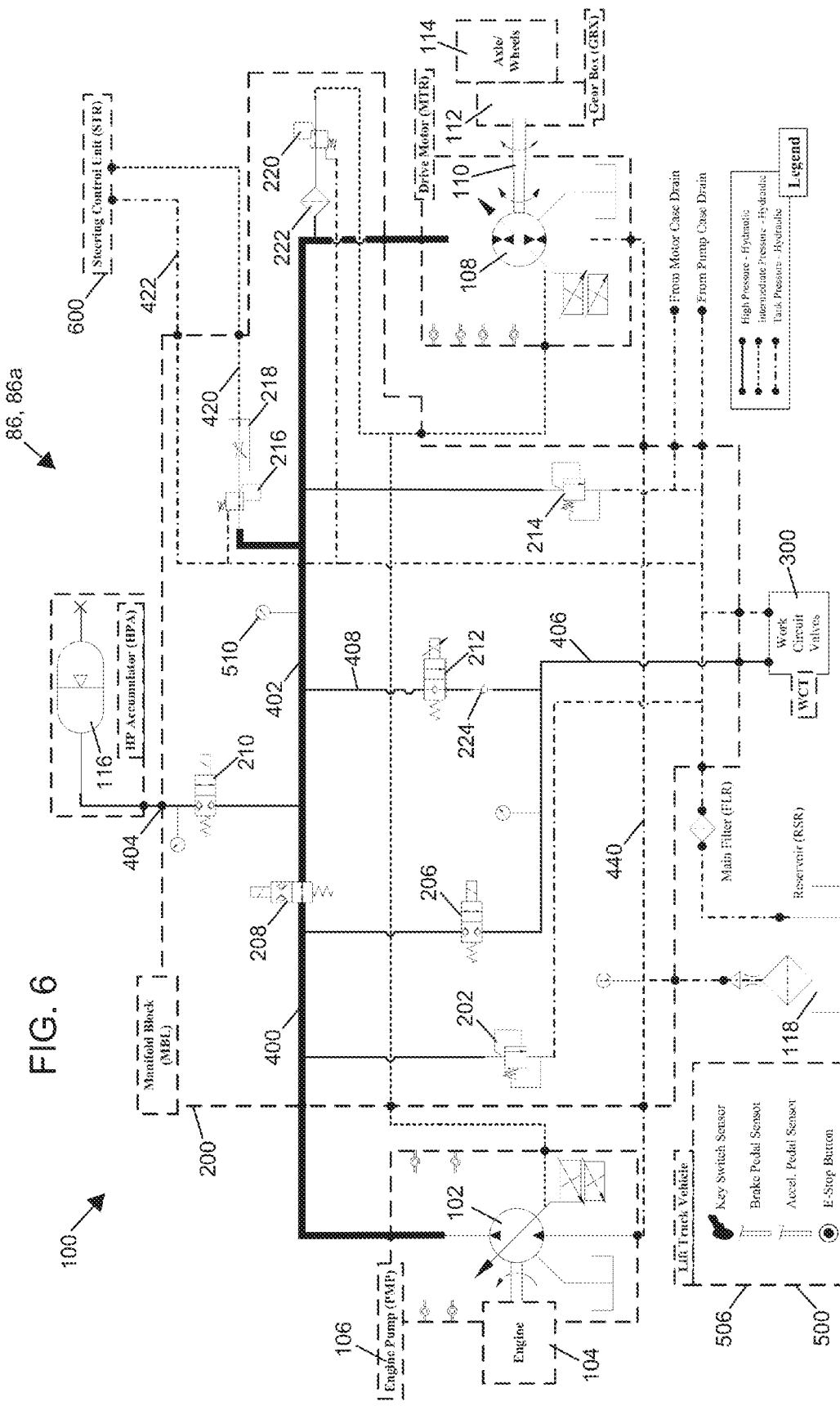
FIG. 6 is the schematic diagram of FIG. 1 further illustrating a fourth mode of the hydraulic system.
Figure 7:
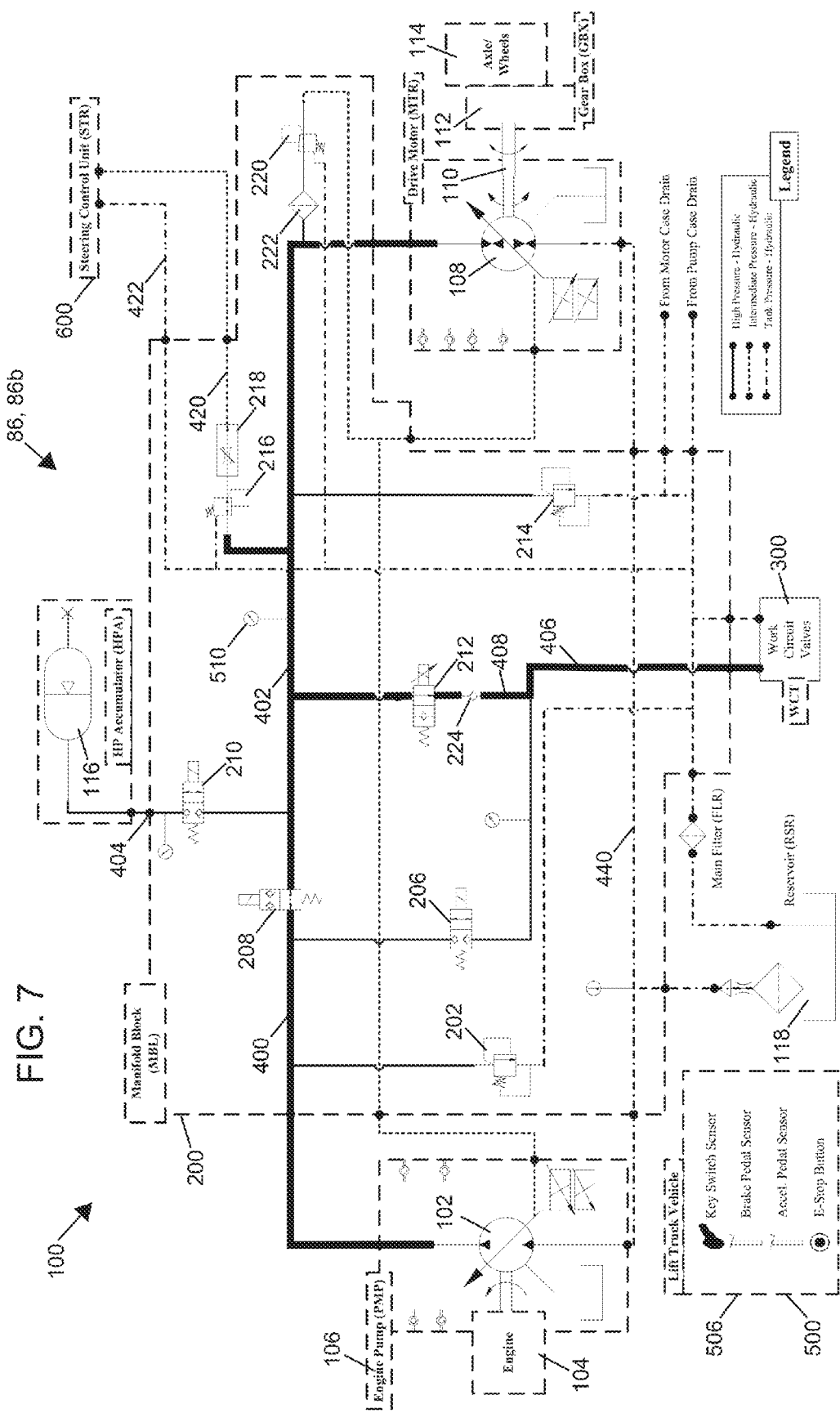
FIG. 7 is the schematic diagram of FIG. 1 further illustrating a fifth mode of the hydraulic system.

The hydraulic system 100 operates in various modes depending on demands placed on the work machine 50 (e.g., by an operator). A control system 500 monitors an operator interface 506 of the work machine 50 and also monitors various sensors 510 and operating parameters of the hydraulic system 100. As illustrated at FIG. 2, signal lines 508 may facilitate communication within the control system 500. The control system 500 evaluates input received from the operator interface 506. In certain embodiments, an electronic control unit 502 monitors the various sensors 510 and operating parameters of the hydraulic system 100 to configure the hydraulic system 100 into the most appropriate mode. The modes include a work circuit primary mode 82, as illustrated at FIG. 3; a hybrid propel mode 84, as illustrated at FIGS. 4 and 5, and a hydrostatic mode 86, as illustrated at FIGS. 6 and 7. The electronic control unit 502 may monitor the operator interface 506, the prime mover 104, and environmental conditions (e.g. ambient temperature). Memory 504 (e.g., RAM memory) may be used within the electronic control unit 502 to store executable code, the operating parameters, the input from the operator interface, etc.

In the work circuit primary mode 82 (see FIG. 3), power from the prime mover 104 is directly supplied to the work circuit 300 by the hydraulic system 100, and power from the hydraulic accumulator 116 is delivered to the drivetrain 114 by the hydraulic system 100. In certain embodiments, power for the steering control unit 600 is also taken from the hydraulic accumulator 116 in the work circuit primary mode 82. The work circuit primary mode 82 may be selected when power demands by the drivetrain 114 are low, relatively low, and/or are anticipated to be low, and power demands and/or hydraulic flow demands by the work circuit 300 are high, relatively high, and/or are anticipated to be high. Such conditions may occur, for example, when the work machine 50 is moving slowly or is stationary and the work attachment 52 is being used extensively and/or with high loading. In the work circuit primary mode 82, the steering control unit 600 may receive power from the hydraulic accumulator 116.

The hybrid propel mode 84 (see FIGS. 4 and 5) may be used when the power demand from the drivetrain 114 is dominate over the power demand of the work circuit 300. The hybrid propel mode 84 may also be used when it is desired to recapture energy from the deceleration of the work machine 50. The hybrid propel mode 84 may further be used to power the work machine 50 without the prime mover 104 running or running full time. For example, the hybrid propel mode 84 allows the prime mover 104 to be shut down upon sufficient pressure existing in the hydraulic accumulator 116. Upon depletion of the hydraulic accumulator 116 to a lower pressure, the hybrid propel mode 84 hydraulically restarts the prime mover 104 thereby recharging the hydraulic accumulator 116 and also providing power to the work machine 50 from the prime mover 104. In the hybrid propel mode 84, the steering control unit 600 may receive power from the hydraulic accumulator 116 and/or the prime mover 104.

The hydrostatic mode 86 (see FIGS. 6 and 7) may be used when the demands of the drivetrain 114 are high, relatively high, and/or are anticipated to be high. For example, when the work machine 50 is driven at a high speed, when the work machine 50 is driven up an incline, and/or when the drivetrain 114 is under a high load. The hydrostatic mode 86 may be used when the demands of the drivetrain 114 are sufficiently high to require a pressure within the hydraulic accumulator 116 to be in excess of a pressure rating and/or a working pressure of the hydraulic accumulator 116. The pressure rating and/or the working pressure of the hydraulic accumulator 116 can correspondingly be lowered in a hydraulic system that can switch between a mode (e.g., the hydrostatic mode 86) where the hydraulic accumulator 116 is isolated and a mode (e.g., the hybrid propel mode 84) where the hydraulic accumulator 116 is connected. In the hydrostatic mode 86, the steering control unit 600 may receive power from the prime mover 104.

The control system 500 may rapidly switch between the work circuit primary mode 82, the hybrid propel mode 84, and/or the hydrostatic mode 86 to continuously adjust the hydraulic system 100 to the demands of the work machine 50.

Turning now to FIG. 1, the hydraulic system 100 is illustrated as a schematic diagram. The hydraulic system 100 is powered by the prime mover 104 which is connected to a pump/motor 102. In certain embodiments, the pump/motor 102 may be replaced with a pump. As depicted, the hydraulic system 100 allows the hydraulic pump/motor 102 to be a single pump/motor (or a single pump) that powers the drivetrain 114, the work circuit 300, and/or the steering control unit 600. By configuring the hydraulic system 100 with the single pump/motor (or the single pump), a cost of the hydraulic system 100 may be reduced, a weight of the hydraulic system 100 may be reduced, the efficiency of the hydraulic system 100 may be increased by reducing the parasitic losses of additional components, and/or a packaging size of the hydraulic system 100 may be reduced.

As depicted, the hydraulic pump/motor 102 and the prime mover 104 may be assembled into an engine pump assembly 106. In certain embodiments, the prime mover 104 turns in a single rotational direction (e.g., a clockwise direction), and thus, the hydraulic pump/motor 102 may also rotate in the single rotational direction of the prime mover 104. Power may be transferred between the hydraulic pump/motor 102 and the prime mover 104 by a shaft (e.g., an input/output shaft of the hydraulic pump/motor 102 may be connected to a crankshaft of the prime mover 104). The power is typically transferred from the prime mover 104 to the hydraulic pump/motor 102 when the hydraulic pump/motor 102 is supplying hydraulic power to the hydraulic accumulator 116, the drivetrain 114, the work circuit 300, and/or the steering control unit 600. The power may be transferred from the hydraulic pump/motor 102 to the prime mover 104 when the hydraulic pump/motor 102 is starting the prime mover 104, during engine braking, etc.

The hydraulic pump/motor 102 may be a variable displacement pump/motor. The hydraulic pump/motor 102 may be an over-center pump/motor. The hydraulic pump/motor 102 includes an inlet 102l (i.e., a low pressure side) that receives hydraulic fluid from a tank 118 via a low pressure line 440, and the hydraulic pump/motor 102 includes an outlet 102h (i.e., a high pressure side) that is connected to a high pressure line 400 of the hydraulic pump/motor 102. When the prime mover 104 supplies power to the hydraulic pump/motor 102, hydraulic fluid is drawn from the tank 118 into the inlet 102l of the hydraulic pump/motor 102 and expelled from the outlet 102h of the hydraulic pump/motor 102 at a higher pressure. In certain embodiments, power may be delivered from the hydraulic pump/motor 102 to the prime mover 104 when a swash plate of the hydraulic pump/motor 102 is positioned over center and high pressure hydraulic fluid from the high pressure line 400 is driven backwards through the hydraulic pump/motor 102 and ejected to the low pressure line 440 and to the tank 118. Alternatively, as illustrated at FIG. 8, a reversing valve 103 of a hydraulic system 100' can be used to cause the prime mover 104 to be backdriven with a hydraulic pump/motor 102', similar to the hydraulic pump/motor 102.

A flow control device 202 (e.g., a relief valve) includes a connection to the high pressure line 400. Upon hydraulic fluid pressure within the high pressure line 400 reaching a predetermined limit, the flow control device 202 opens and dumps a portion of the hydraulic fluid to the tank 118 and thereby protecting the high pressure line 400 from reaching an over pressure condition.

A flow control device 206 is connected between the high pressure line 400 and a high pressure line 406 of the work circuit 300. In the depicted embodiment, the flow control device 206 is a work circuit valve.

A flow control device 208 is connected between the high pressure line 400 and a high pressure line 402. As depicted, the high pressure line 402 may be connected to an inlet 108h (i.e., a high pressure side) of a pump/motor 108. The flow control device 208 may be an isolation valve. In certain embodiments, the flow control device 206 and the flow control device 208 may be combined into a single three-way valve 207 (see FIG. 8).

The high pressure line 402 is connected to the hydraulic accumulator 116 by a fluid flow control device 210. In the depicted embodiment, the fluid flow control device 210 is an isolation valve for the hydraulic accumulator 116. In the depicted embodiment, the fluid flow control device 210 and the hydraulic accumulator 116 are connected by an accumulator line 404.

The high pressure line 402 is further connected to the high pressure line 406 by a flow control device 212 and another flow control device 224. In the depicted embodiment, the flow control device 212 is a Valvistor® proportional flow control device, and the flow control device 224 is a check valve that prevents hydraulic fluid from the high pressure line 406 from entering the high pressure line 402. In the depicted embodiment, the flow control devices 212 and 224 are connected in series along a cross-over flow line 408 that connects the high pressure line 402 and the high pressure line 406. In other embodiments, a single flow control device may be used along the cross-over flow line 408.

Certain aspects of the propulsion system of the work machine 50 will now be described. The propulsion system includes the pump/motor 108 that both transmits and receives power to and from the drivetrain 114 via an output shaft 110. In particular, the output shaft 110 is connected to a gear box 112. As illustrated at FIG. 9, the gear box 112 may include a differential connected to a pair of the drive wheels 54. In other embodiments, a hydraulic pump/motor may be included at each of the drive wheels 54, and the differential may not be used. When sending power to the drivetrain 114, the pump/motor 108 may accelerate the work machine 50, may move the work machine 50 up an incline, and/or may otherwise provide overall movement to the work machine 50. When the work machine 50 decelerates and/or travels down an incline, the pump/motor 108 may receive energy from the drivetrain 114. When the hydraulic system 100 is in the hybrid propel mode 84 or the work circuit primary mode 82, the pump/motor 108 may send hydraulic energy to the hydraulic accumulator 116. In particular, the pump/motor 108 may receive hydraulic fluid from the tank 118 via the low pressure line 440 and pressurize the hydraulic fluid and send it through the high pressure line 402 through the fluid flow control device 210 and the accumulator line 404 and into the hydraulic accumulator 116.

The pump/motor 108 may be driven by hydraulic power from the hydraulic accumulator 116 or the hydraulic pump/motor 102. In particular, when the hydraulic system 100 is in the work circuit primary mode 82, the pump/motor 108 receives the hydraulic power from the hydraulic accumulator 116, as illustrated at FIG. 3. When the hydraulic system 100 is in the hybrid propel mode 84, as illustrated at FIGS. 4 and 5, the pump/motor 108 may receive hydraulic power from either the hydraulic pump/motor 102, the hydraulic accumulator 116, or both the hydraulic pump/motor 102 and the hydraulic accumulator 116. When the hydraulic system 100 is in the hydrostatic mode 86, as illustrated at FIGS. 6 and 7, the pump/motor 108 receives power from the hydraulic pump/motor 102. However, the pump/motor 108 may deliver power to the hydraulic pump/motor 102 and the prime mover 104 may thereby provide engine braking.

A relief valve 214 may be connected between the high pressure line 402 and the tank 118. Feedback from the high pressure line 402 may be given to the hydraulic pump/motor 102 by way of a pump/motor control pressure valve 220 (e.g. a pressure reducing valve). In particular, a point of use filter device 222 is connected between the high pressure line 402 and the pump/motor control pressure valve 220. The pump/motor control pressure valve 220 may feed a pressure signal to the hydraulic pump/motor 102 and thereby control the hydraulic pump/motor 102 in certain embodiments and/or in certain modes.

In the depicted embodiment, the steering control unit 600 receives hydraulic power from the high pressure line 402. In particular, an intermediate pressure steering line 420 is connected to the high pressure line 402 via a steering feed valve 218 (e.g., a flow control valve) and a steering feed valve 216 (e.g., a pressure reducing valve). A return line 422 is connected between the steering control unit 600 and the tank 118.

Various components may be included in a manifold block 200. For example, the flow control device 202, the flow control device 206, the flow control device 208, the fluid flow control device 210, the flow control device 212, the relief valve 214, the pump/motor control pressure valve 220, the device 222, and/or the flow control device 224 may be included in the manifold block 200.

Turning now to FIG. 2, a schematic diagram of the control system 500 is shown with a schematic diagram of the hydraulic system 100. As can be seen, the hydraulic system 100 monitors a plurality of sensors indicating the state of the hydraulic system 100. The control system 500 further monitors the operator interface 506 thereby allowing an operator to take control of the hydraulic system 100 and thereby take control of the work machine 50. The electronic control unit 502 of the control system 500 may perform calculations that model the hydraulic system 100 in the various modes and thereby determine the optimal mode and thereby select the optimal mode for the given working conditions and the given operator input. Under certain conditions, the mode of the hydraulic system 100 is selected to maximize fuel efficiency of the work machine 50. In other conditions, the mode of the hydraulic system 100 is selected to maximize performance of the hydraulic system 100 and thereby the work machine 50. The electronic control unit 502 may learn a working cycle that the work machine 50 repeatedly undertakes. By learning the working cycle, the electronic control unit 502 can maximize efficiency for the working cycle and identify when the work machine 50 is in the working cycle. The electronic control unit 502 may switch modes differently depending on which working cycle the work machine 50 is in. By switching modes throughout the working cycle, various parameters of the hydraulic system 100 can be optimized for efficiency or performance. For example, charge pressure of the hydraulic accumulator 116, swash plate angle of the hydraulic pump/motor 102 and/or the pump/motor 108, and/or the timing of starting and stopping the prime mover 104 may be determined based on the working cycle of the work machine 50. The control system 500 may emulate a conventional work machine such that the work machine 50 behaves and feels like the conventional work machine to the operator.

Turning now to FIG. 3, the work circuit primary mode 82 is illustrated. The work circuit primary mode 82 is selected by the control system 500 when the work attachment 52 is under heavy use, sustained use, and/or use that requires high volumetric flow rates of hydraulic fluid. The drivetrain 114 of the work machine 50 is operational in the work circuit primary mode 82. In particular, the hydraulic accumulator 116 can supply power to and receive power from the pump/motor 108. Upon the hydraulic accumulator 116 being depleted to a given level, the control system 500 may quickly switch the hydraulic system 100 into the hybrid propel mode 84 to recharge the hydraulic accumulator 116. Upon the hydraulic accumulator 116 being recharged to a given pressure level, the control system 500 may return the hydraulic system 100 to the work circuit primary mode 82.

Turning now to FIG. 4, the hybrid propel mode 84 is illustrated. In particular, a hybrid mode 84a is illustrated. The hybrid mode 84a allows the exchange of energy between the hydraulic pump/motor 102, the hydraulic accumulator 116, and the pump/motor 108. In particular, the hydraulic pump/motor 102 may supply hydraulic power to the hydraulic accumulator 116 for the purpose of recharging the hydraulic accumulator 116. The hydraulic pump/motor 102 may separately or simultaneously supply power to the pump/motor 108 to propel the work machine 50. The hydraulic accumulator 116 may supply power to the hydraulic pump/motor 102 for the purpose of starting the prime mover 104. Separately or simultaneously, the hydraulic accumulator 116 may supply power to the pump/motor 108 to propel the work machine 50. The pump/motor 108 may supply hydraulic fluid power to the hydraulic accumulator 116 and thereby charge the hydraulic accumulator 116. Separately or simultaneously, the pump/motor 108 may provide power to the hydraulic pump/motor 102. The power supply to the hydraulic pump/motor 102 can be used to start the prime mover 104 and/or to provide engine braking (e.g., upon the hydraulic accumulator 116 being full). When the hydraulic system 100 is in the hybrid mode 84a, the work circuit 300 may be cut off from hydraulic fluid power. In this case, the work circuit 300 may have no demand for hydraulic power.

Turning now to FIG. 5, the hybrid propel mode 84 is again illustrated. In particular, a hybrid mode 84b is illustrated. The hybrid mode 84b is similar to the hybrid mode 84a except that the cross-over flow line 408 is open allowing hydraulic fluid power from the high pressure line 402 to be supplied to the work circuit 300. In the hybrid mode 84b, the hydraulic pump/motor 102, the hydraulic accumulator 116, and/or the pump/motor 108 may supply hydraulic power to the work circuit 300.

The hybrid propel mode 84 may be preferred when the work machine 50 is undergoing a moderate workload, and/or when high efficiency and/or energy recovery from the drivetrain 114 is desired.

Turning now to FIG. 6, the hydrostatic mode 86 is illustrated. In particular a hydrostatic mode 86a is illustrated. The hydrostatic mode 86a may be used when the drivetrain 114 of the work machine 50 is under heavy load. For example, when the work machine 50 is driven at high torque/power and/or when the work machine 50 is driven up an incline. When the hydraulic system 100 is operated in the hydrostatic mode 86a, hydraulic pressure within the high pressure line 400 and the high pressure line 402 may exceed a working pressure and/or a rated pressure of the hydraulic accumulator 116. By switching between the hybrid propel mode 84 and the hydrostatic mode 86, the hydraulic system 100 may undertake tasks that result in high pressures in the high pressure line 402 without exposing the hydraulic accumulator 116 to the high pressures. Thus, the benefits of the hybrid propel mode 84 can be enjoyed without requiring that the accumulator 116 have a pressure rating that matches the maximum pressure rating of the hydraulic pump/motor 102. By bypassing (e.g., isolating) the accumulator 116 with the fluid flow control device 210, the hydraulic system 100 does not need to wait for the accumulator 116 to be pressurized up to the desired working pressure. When the hydraulic system 100 is in the hydrostatic mode 86a, the work circuit 300 may be cut off from hydraulic fluid power. In this case, the work circuit 300 may have no demand for hydraulic power.

Turning now to FIG. 7, the hydrostatic mode 86 is further illustrated. In particular, a hydrostatic mode 86b is illustrated. The hydrostatic mode 86b is similar to the hydrostatic mode 86a, except that the cross-over flow line 408 is open allowing hydraulic fluid power from the high pressure line 402 to be supplied to the work circuit 300. In the hydrostatic mode 86b, the hydraulic pump/motor 102 and/or the pump/motor 108 may supply hydraulic power to the work circuit 300.

Turning now to FIG. 8, a system forming a second embodiment of the principles of the present disclosure is presented. The system includes the hydraulic system 100', mentioned above. As many of the concepts and features are similar to the first embodiment, shown at FIGS. 1-7, the description for the first embodiment is hereby incorporated by reference for the second embodiment. Where like or similar features or elements are shown, the same reference numbers will be used where possible. The following description for the second embodiment will be limited primarily to the differences between the first and second embodiments. In the hydraulic system 100', the flow control device 206 and the flow control device 208 of the hydraulic system 100 have been replaced by the single three-way valve 207. In addition, the flow control device 212 and the flow control device 224 of the hydraulic system 100 has been replaced by an on-off electrically controlled valve 212' and a constant flow valve 224'. The substitution of the on-off electrically controlled valve 212' and the constant flow valve 224' can be further made in other embodiments of the present disclosure. Likewise, the flow control device 212 and the flow control device 224 can be substituted in the present embodiment.

Turning now to FIG. 9, a schematic layout of the work machine 50 is illustrated. In the depicted embodiment, the work machine 50 is a fork truck.

Figure 10:
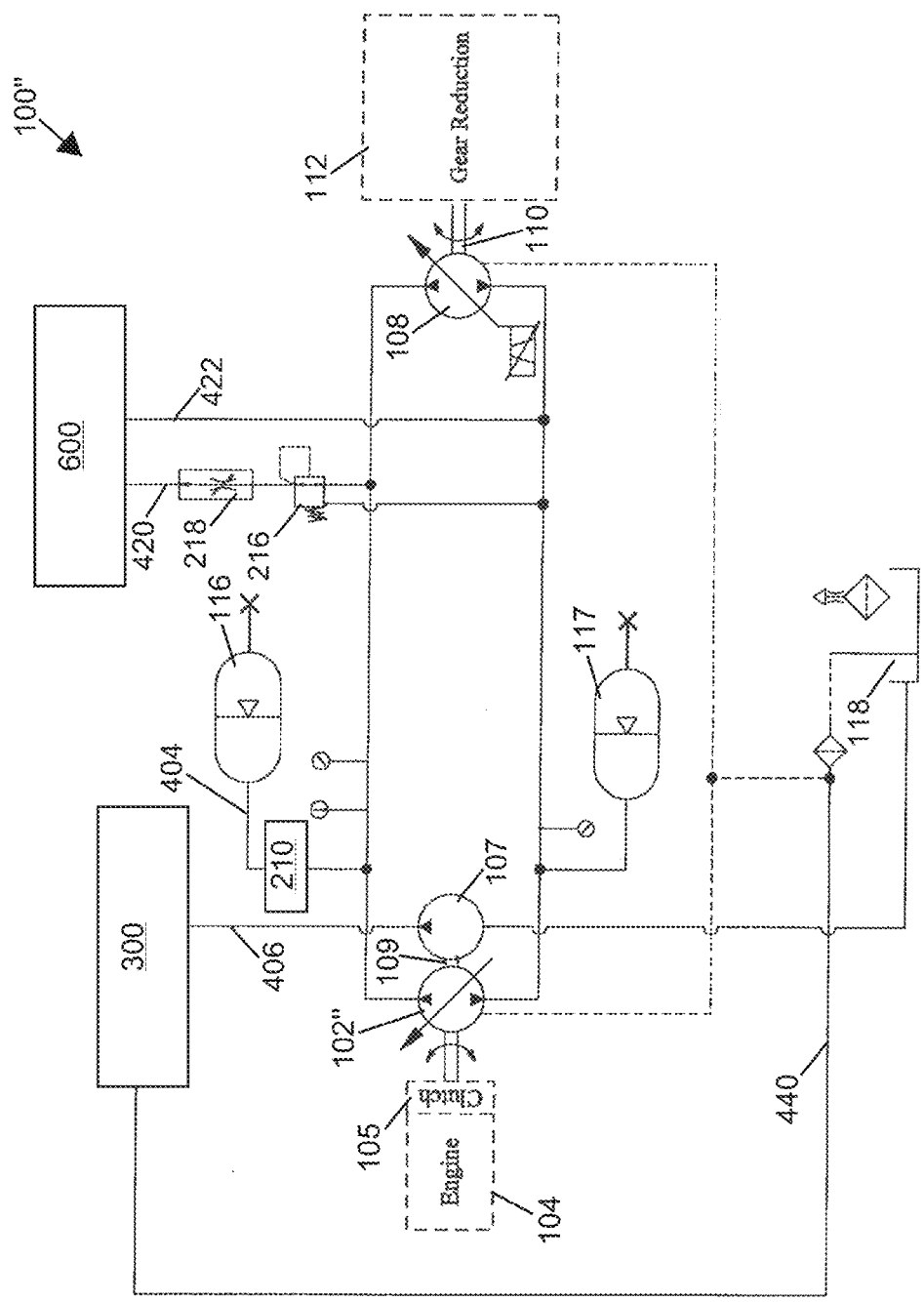
FIG. 10 is a schematic diagram of still another hydraulic system having features that are examples according to the principles of the present disclosure.

Turning now to FIG. 10, a system forming a third embodiment of the principles of the present disclosure is schematically illustrated. The system includes a hydraulic system 100". As with the hydraulic system 100, the hydraulic system 100" similarly powers the work circuit 300. However, in the hydraulic system 100" a hydraulic pump 107 is used to provide hydraulic power to the work circuit 300. The hydraulic pump 107, in turn, is connected by a shaft 109 to a pump/motor 102". A clutch 105 is operably connected between the prime mover 104 and the hydraulic pump/motor 102". A low pressure accumulator 117 (i.e., a storage accumulator) is further included connected to a low pressure side of the hydraulic pump/motor 102".

By placing the hydraulic pump/motor 102" at a zero swash plate displacement angle, power can flow from the prime mover 104 through the clutch 105 and into the hydraulic pump 107. Thus, power from the prime mover 104 can directly power the work circuit 300. While the prime mover 104 is directly powering the work circuit 300, the hydraulic accumulator 116 can be both supplying and receiving power from the pump/motor 108. Thus, the hydraulic system 100" has a mode similar to the work circuit primary mode 82, illustrated at FIG. 3.

Hydraulic power from the hydraulic accumulator 116 can be used to start the prime mover 104. In particular, hydraulic power flows from the hydraulic accumulator 116, through fluid flow control device 210, and into the hydraulic pump/motor 102". The clutch 105 can be engaged and thereby the hydraulic pump/motor 102" can start the prime mover 104.

The hydraulic pump/motor 102", the hydraulic accumulator 116, the pump/motor 108, and the prime mover 104 can operate in a hybrid propel mode similar to the hybrid propel mode 84. When hydraulic power is required by the work circuit 300, the hydraulic pump 107 can receive power from the hydraulic pump/motor 102" via the shaft 109. Thus, the hydraulic system 100" has a mode similar to the hybrid mode 84b, illustrated at FIG. 5.

The hydraulic accumulator 116 can be isolated from the pump/motor 108 by closing the fluid flow control device 210. In this way, the hydraulic system 100" can operate in a hydrostatic mode similar to the hydrostatic mode 86. If the work circuit 300 requires hydraulic power, the hydraulic pump 107 may receive power from the hydraulic pump/motor 102" via the shaft 109.

Figure 11:
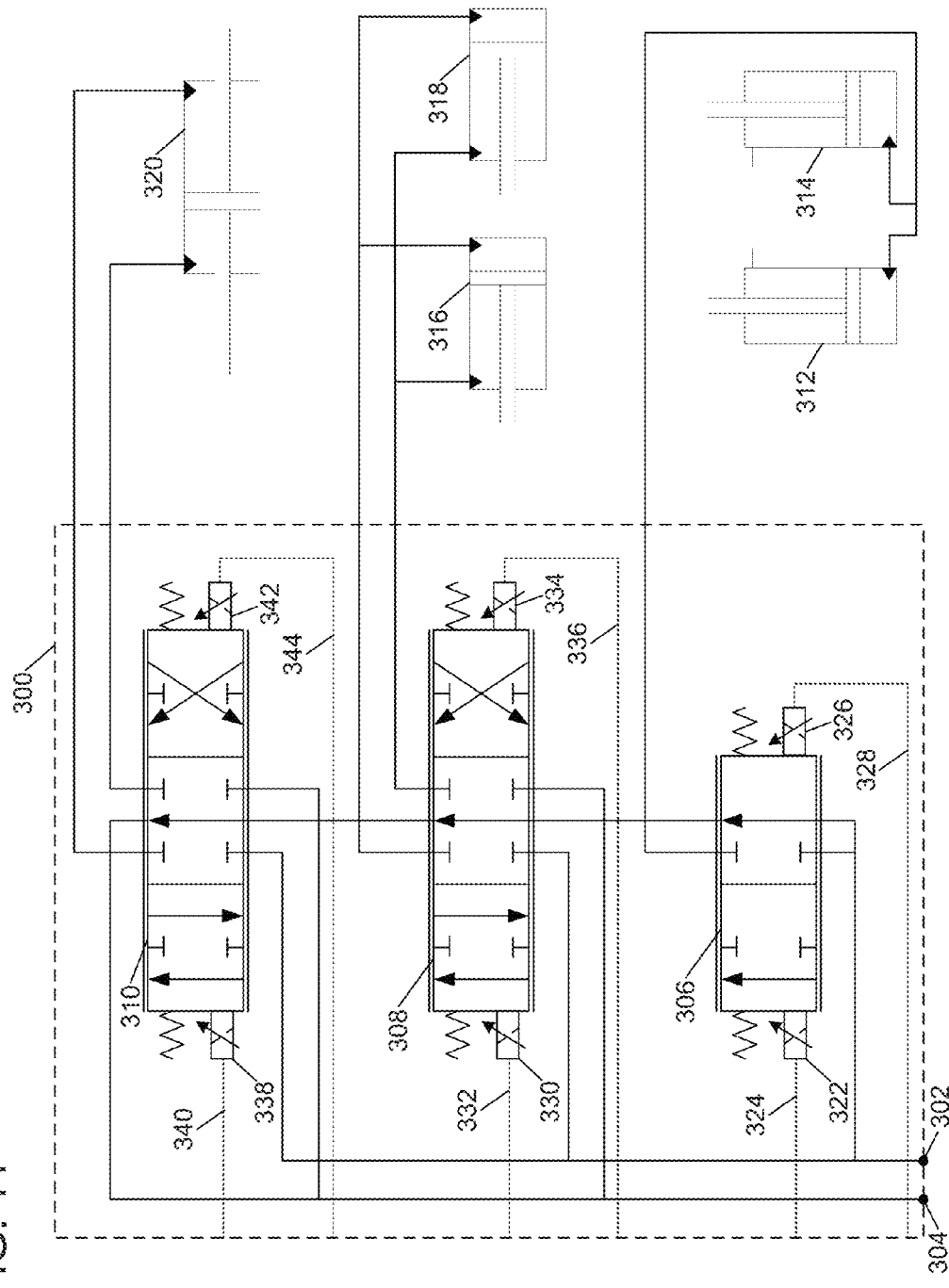
FIG. 11 is a schematic diagram of a work circuit usable with the hydraulic system of FIG. 1.

Turning now to FIG. 11, a detailed schematic diagram of the example work circuit 300 is shown. The work circuit 300 is for activating the work attachment 52 of the work machine 50. In the embodiment shown, the work circuit 300 has a pump port 302 for connecting to the pump/motor 102 via the high pressure line 406. The work circuit 300 also has a tank port 304 for connecting to the reservoir or tank 118 (e.g., via the low pressure line 440).

The work circuit 300 also includes a first valve 306 for enabling a work attachment lift function, a second valve 308 for enabling a work attachment tilt function, and a third valve 310 for enabling a work attachment side shift function. In the particular embodiment shown, the valves 306, 308, 310 are proportional valves of the spool and sleeve type.

The first valve 306 is configured and arranged to selectively provide pressurized fluid from the port 302 to one or both of hydraulic lift cylinders 312, 314 which are mechanically coupled to the work attachment 52. The operation of the valve 306 causes the work attachment 52 to be selectively raised or lowered in a lifting function. The lifting speed of the lift cylinders 312, 314 is a result of the flow through the valve 306. Flow through the valve 306 can be controlled by a pair of variable solenoid actuators 322, 326 acting on each end of the spool of the valve 306. The variable solenoid actuators 322, 326 can be operated by the control system 500 via control lines 324, 328, respectively. Alternatively, in certain embodiments, flow through the valve 306 can be controlled by a lever.

The second valve 308 is configured and arranged to selectively provide pressurized fluid from the port 302 to one or both of hydraulic tilt cylinders 316, 318 which are mechanically coupled to the work attachment 52. The operation of the valve 308 causes the work attachment 52 to be selectively tilted forward and backward in a tilting function. Flow through the valve 308 can be controlled by a pair of variable solenoid actuators 330, 334 acting on each end of the spool of the valve 308. The variable solenoid actuators 330, 334 can be operated by the control system 500 via control lines 332, 336, respectively. Alternatively, in certain embodiments, flow through the valve 308 can be controlled by a lever.

The third valve 310 is configured and arranged to selectively provide pressurized fluid from the port 302 to a side shift hydraulic cylinder 320 which is mechanically coupled to the work attachment 52. The operation of the valve 310 causes the work attachment 52 to be selectively moved from side to side in a side shift function. Flow through the valve 310 can be controlled by a pair of variable solenoid actuators 338, 342 acting on each end of the spool of the valve 310. The variable solenoid actuators 338, 342 can be operated by the control system 500 via control lines 338, 342, respectively. Alternatively, in certain embodiments, flow through the valve 310 can be controlled by a lever.

In certain embodiments, the functions or sets of functions described above may be accomplished with a single drive pump component (e.g., a single pump, a single pump/motor, a single pumping rotating group, etc.). As used herein, the term "pump" indicates the ability to transfer fluid from a lower pressure to a higher pressure over a duration sufficient to power a function. The single drive pump may include a charge pump. As used herein, the terms "drive pump" and "drive hydraulic pump" indicate a pump or pump/motor that is driven by the prime mover (e.g., directly mechanically driven).

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A hydraulic circuit architecture for a mobile work vehicle, the hydraulic circuit architecture comprising:
    a drive hydraulic pump adapted to be driven by a prime mover, the drive hydraulic pump having a high pressure side and a low pressure side;
    a hydraulic work circuit adapted for connection to at least one actuator for driving a work implement of the mobile work vehicle;
    a hydraulic propel circuit including a propel hydraulic motor adapted to be connected to a drive train of the mobile work vehicle, the hydraulic propel circuit also including a hydraulic accumulator; and
    a circuit selector for selectively connecting the high pressure side of the drive hydraulic pump to the hydraulic work circuit and the hydraulic propel circuit;
    wherein the hydraulic circuit architecture is operable in:
       a) a first mode where the hydraulic propel circuit is connected to the high pressure side of the drive hydraulic pump and the hydraulic work circuit is disconnected from the high pressure side of the drive hydraulic pump; and b) a second mode where the hydraulic work circuit is connected to the high pressure side of the drive hydraulic pump and the hydraulic propel circuit is disconnected from the high pressure side of the drive hydraulic pump; and
    wherein when the hydraulic circuit architecture is in the second mode, stored energy from the hydraulic accumulator can be used to drive the propel hydraulic motor to cause propulsion of the mobile work vehicle.

2. The hydraulic circuit architecture of claim 1, further comprising a cross-over hydraulic flow line that provides fluid communication between the hydraulic work circuit and the hydraulic propel circuit, wherein a cross-over valve is provided for opening and closing the cross-over hydraulic flow line.

3. The hydraulic circuit architecture of claim 2, wherein the cross-over valve controls a flow rate through the cross-over hydraulic flow line.

4. The hydraulic circuit architecture of claim 2, wherein the cross-over hydraulic flow line allows the stored energy from the hydraulic accumulator to be used to drive the at least one actuator of the hydraulic work circuit.

5. The hydraulic circuit architecture of claim 2, wherein the hydraulic circuit architecture is operable in a third mode where both the hydraulic work circuit and the hydraulic propel circuit receive no hydraulic fluid flow from the high pressure side of the drive hydraulic pump, and wherein the cross-over hydraulic flow line allows the stored energy from the hydraulic accumulator to be used to drive the at least one actuator of the hydraulic work circuit and the stored energy from the hydraulic accumulator drives the propel hydraulic motor.

6. The hydraulic circuit architecture of claim 1, wherein the propel hydraulic motor is a variable displacement hydraulic pump/motor, wherein the hydraulic circuit architecture is operable in a charge mode where hydraulic fluid pumped by the variable displacement hydraulic pump/motor is used to charge the hydraulic accumulator.

7. The hydraulic circuit architecture of claim 6, wherein kinetic energy of the mobile work vehicle is transformed into added stored energy that is stored in the hydraulic accumulator when the mobile work vehicle decelerates.

8. The hydraulic circuit architecture of claim 1, wherein the drive hydraulic pump is a hydraulic pump/motor, and wherein hydraulic fluid from the hydraulic accumulator can be used to drive the hydraulic pump/motor.

9. The hydraulic circuit architecture of claim 8, wherein the hydraulic pump/motor may start the prime mover when the hydraulic pump/motor is driven by the hydraulic fluid from the hydraulic accumulator.

10. The hydraulic circuit architecture of claim 1, wherein the circuit selector includes a valve.

11. The hydraulic circuit architecture of claim 1, wherein the circuit selector includes a plurality of valves.

12. The hydraulic circuit architecture of claim 1, further comprising an isolator valve for selectively isolating the hydraulic accumulator from the hydraulic propel circuit.

13. The hydraulic circuit architecture of claim 1, further comprising a hydraulic steering circuit in fluid communication with the hydraulic propel circuit.

14. The hydraulic circuit architecture of claim 1, wherein the mobile work vehicle is a fork lift, wherein the prime mover is a combustion engine mechanically coupled to the drive hydraulic pump, wherein the hydraulic work circuit is hydraulically coupled to the at least one actuator, and wherein the at least one actuator includes a first hydraulic cylinder for lifting a fork of the fork lift, a second hydraulic cylinder for tilting the fork, and a third hydraulic cylinder for laterally moving the fork.

15. The hydraulic circuit architecture of claim 14, wherein the first hydraulic cylinder is a main stage cylinder, wherein the at least one actuator further includes a secondary stage set of hydraulic cylinders that includes at least one second stage cylinder for lifting the fork of the fork lift.

16. The hydraulic circuit architecture of claim 12, wherein a maximum working pressure of the hydraulic propel circuit is higher than a working pressure of the hydraulic accumulator.

17. The hydraulic circuit architecture of claim 12, wherein a maximum working pressure of the hydraulic propel circuit is higher than a rated pressure of the hydraulic accumulator.

18. The hydraulic circuit architecture of claim 1, wherein the drive hydraulic pump is an only drive hydraulic pump of the hydraulic circuit architecture.

19. The hydraulic circuit architecture of claim 18, wherein the drive hydraulic pump includes a charge pump.

20. A hydraulic circuit architecture for a mobile work vehicle, the hydraulic circuit architecture comprising:
    a hydraulic work circuit adapted for connection to at least one actuator for driving a work implement of the mobile work vehicle; and
    a hydraulic propel circuit including a propel hydraulic motor adapted to be connected to a drive train of the mobile work vehicle, the hydraulic propel circuit also including a hydraulic accumulator;

wherein the hydraulic circuit architecture is operable in at least one mode where the hydraulic work circuit is hydraulically isolated from the hydraulic propel circuit, and wherein the hydraulic circuit architecture includes means for transferring energy from the hydraulic accumulator of the hydraulic propel circuit to the hydraulic work circuit.

21. The hydraulic circuit architecture of claim 20, further comprising a drive hydraulic pump adapted to be driven by a prime mover, and a work circuit hydraulic pump adapted to be driven by the prime mover, wherein the means for transferring the energy from the hydraulic accumulator of the hydraulic propel circuit to the hydraulic work circuit includes shaft power being transferred from the drive hydraulic pump to the work circuit hydraulic pump.

22. The hydraulic circuit architecture of claim 21, further comprising a clutch operably connected between the prime mover and the drive hydraulic pump, wherein the clutch may decouple the prime mover from the drive hydraulic pump when the shaft power is being transferred from the drive hydraulic pump to the work circuit hydraulic pump.

23. The hydraulic circuit architecture of claim 20, further comprising a cross-over hydraulic flow line that provides fluid communication between the hydraulic work circuit and the hydraulic propel circuit, wherein a cross-over valve is provided for opening and closing the cross-over hydraulic flow line.

24. The hydraulic circuit architecture of claim 23, wherein the means for transferring the energy from the hydraulic accumulator of the hydraulic propel circuit to the hydraulic work circuit includes opening the cross-over hydraulic flow line.

25. The hydraulic circuit architecture of claim 21, wherein the drive hydraulic pump is an only drive hydraulic pump of the hydraulic circuit architecture.

26. The hydraulic circuit architecture of claim 25, wherein the drive hydraulic pump includes a charge pump.

27. A hydraulic circuit architecture for a mobile work vehicle, the hydraulic circuit architecture comprising:

a work circuit adapted for connection to at least one actuator for driving a work implement of the mobile work vehicle, the work circuit being hydraulically powered by a first rotating group mounted on a first rotatable shaft; and a hydraulic propel circuit that is not in fluid communication with the work circuit, the hydraulic propel circuit including a propel hydraulic motor adapted to be connected to a drive train of the mobile work vehicle, the hydraulic propel circuit also including a hydraulic accumulator, and the hydraulic propel circuit being hydraulically powered by a second rotating group mounted on the first rotatable shaft, the second rotating group being a pump/motor, wherein by operating the second rotating group as a motor, energy from the accumulator can be transferred through the first rotatable shaft to the first rotating group to hydraulically power the work circuit.

28. The hydraulic circuit architecture of claim 1, wherein the drive hydraulic pump is a single hydraulic pump of the hydraulic circuit architecture that is adapted to power at least the hydraulic work circuit and the hydraulic propel circuit.

29. The hydraulic circuit architecture of claim 28, wherein the single hydraulic pump includes a charge pump.

* * * * *